United States Patent
Rozario et al.

(10) Patent No.: US 6,345,328 B1
(45) Date of Patent: Feb. 5, 2002

(54) GEAR BOX FOR MULTIPLE CLOCK DOMAINS

(75) Inventors: Ranjit J. Rozario, San Jose; Sridhar P. Subramanian, Sunnyvale; Ravikrishna Cherukuri, Milpitas, all of CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/328,940

(22) Filed: Jun. 9, 1999

(51) Int. Cl.[7] .......................... G06F 13/14; G06F 13/20
(52) U.S. Cl. ............................ 710/52; 710/65; 710/70; 713/600; 327/144; 326/93
(58) Field of Search ............................. 710/52, 70, 65; 326/93; 713/600; 327/144

(56) References Cited

U.S. PATENT DOCUMENTS

| | | | |
|---|---|---|---|
| 5,602,878 A | 2/1997 | Cross | 375/354 |
| 5,638,015 A | 6/1997 | Gujral et al. | 327/144 |
| 5,710,910 A | 1/1998 | Kehl et al. | 395/551 |
| 6,295,636 B1 * | 9/2001 | Dupenloup | 716/18 |
| 6,308,229 B1 * | 10/2001 | Masteller | 710/52 |

OTHER PUBLICATIONS

"Direct Rambus® Clock Generator," Data Sheet, Document DL0056—Version 0.90, Rambus, Inc., Mar. 1999, 22 pages, see pp. 4–5.

* cited by examiner

Primary Examiner—Thomas Lee
Assistant Examiner—Rehana Perveen
(74) Attorney, Agent, or Firm—Skjerven Morrill MacPherson LLP; Marc R. Ascolese

(57) ABSTRACT

A gear box module or circuit can act as an interface for transferring data from a first clock domain to a second clock domain. The gear box circuit uses a level sensitive memory element coupled to an input selection circuit to receive data from logic in the first clock domain and provide the data to logic in the second clock domain. An input selection signal causes the selection circuit to select the input source for the level sensitive memory element, thereby allowing the proper signal to be provided as output to logic in the second clock domain. Additionally, the gear box can provide the proper output signal for logic in the second domain using circuitry to alternately mask the gear box output. The gear box receives control signals, including for example the input selection signal, from control circuitry. The logic in each clock domain does not have to be aware of the clock frequency on the other side of the gear box, nor does it need to be aware of the ratio of clock frequencies between clock domains. Consequently, the logic in each domain is simplified, the gear box circuit itself can be independent of the gear ratio (i.e., the ratio of clock frequencies), timing delays can be reduced, and metastability can be avoided.

37 Claims, 11 Drawing Sheets

GEAR BOX FOR MULTIPLE CLOCK DOMAINS

BACKGROUND OF THE INVENTION

1. Field of the Invention

This invention relates to clocking techniques for digital circuits, and more particularly to techniques for transferring data from one clock domain to another clock domain in a digital circuit.

2. Description of the Related Art

Logic functions generally, and the various components of digital logic circuits in particular, can be characterized as either combinational (sometimes referred to as combinatorial) or sequential. Combinational logic circuits provide output signals that are directly related to the current combination of values at the circuit's inputs, and include logic gates that, generally, perform the Boolean logical operations, e.g., AND, OR and NOT. In contrast, sequential logic circuits provide output signals that depend not only on current input values, but also on previous input values or the present state of the circuit, and are comprised of memory elements, such as flip-flops or registers, that maintain state information, that is, that store a value, and combinational logic.

Sequential logic circuits are further characterized as either asynchronous (unclocked) or synchronous (clocked). While the input signals to an asynchronous sequential logic circuit can change at any time, and thus, the state of the circuit is capable of changing at any time, the input signals to a synchronous logic circuit are capable of changing the state, and thus, the output of the circuit, only at specific times, as determined by a particular clocking or timing methodology.

In general, clocked or synchronous sequential circuits are triggered, that is, they change state, according to clock pulses input to the circuit. As the output of a memory element is a signal representing the current state of the memory element, it follows that the output of a clocked sequential circuit is updated in synchronization with clock pulses provided as input to the circuit. A common timing methodology in the art is edge-triggered clocking, where a memory element is triggered, i.e., the one or more inputs to the memory element are sampled, during either the leading (rising) or trailing (falling) edge of a clock signal supplied as input to the memory element. Thus, for example, a trailing edge triggered D-type flip-flop changes state (e.g. provides the signal supplied to the data input as its output signal) on the trailing edge of a clock signal in transition and maintains that state for one clock cycle, that is, until another trailing edge of a clock signal is detected. When it is desirable for a flip-flop to change state with less frequency than every clock cycle (e.g., when propagational delay of a signal through combinational logic coupled between a first and second flip-flop exceeds the time to complete one clock cycle) a control signal provided as input to the second flip-flop may further control at which trailing edge of a clock signal it may change state, so that it is capable of changing state only after the signal output from the first flip-flop has arrived at one of its inputs.

At the time when a memory element such as a flip-flop or register is triggered by the edge of a clock signal, input signals applied to the memory element should be stable. If one or more inputs to a memory element are changing state at the time at which a clock edge is received (and the inputs sampled), the state and, thus, the output of the memory element, may be unstable. When one or more inputs of a memory element are in transition at the time the memory element is triggered, thereby causing the state and output to be indeterminate, the memory element is said to be in a metastable state.

To avoid metastability, digital logic is designed with a variety of timing requirements in mind. The setup time ($t_{setup}$) defines that period of time immediately prior to receiving a clock edge in which inputs to the memory element must be stable and valid, either high or low. Another timing requirement, hold time ($t_{hold}$), defines the period of time immediately following receiving a clock edge in which inputs to the memory element must be stable and valid. Metastability can result if such fundamental timing requirements are not met. Consequently, each input to a synchronous memory element must be stable, that is, maintain a voltage level representing a valid logic value so that a single valid output logic value is detected, for a window of time equal to $t_{setup}+t_{hold}$ in order to avoid metastability. It should be further noted, as is well known to those having ordinary skill in the art, that metastability can manifest itself in many ways, including, but not limited to, an unpredictable output logic value, oscillation of the output value, indeterminate voltage level of the output representing a illegitimate logic value somewhere between a valid high or valid low logic value, and an indeterminate period of instability.

When coupling two or more synchronous digital circuits (or two or more portions of a single digital circuit) together it may not be possible or advantageous for all the logic circuitry involved to derive its clock source from the same clock signal. For example, a host bridge or north bridge integrated circuit for a computer system provides, inter alia, bus control signals and address paths for transfers among a host bus (e.g. the bus over which the computer system's processor communicates), one or more peripheral buses, and memory. Each of the busses (and the devices associated with those busses) may use a different clock signal frequency. In such a case, a plurality of clocks, each providing a clock signal to an exclusive region of the logic circuitry of a device, or each providing a clock signal to the logic circuitry of separate, external, devices may be employed. Thus, multiple clock domains may exist, either within a single circuit, or between circuits that exchange data. Components of a synchronous logic circuit which derive their clock source from the same clock are in the same clock domain, while components of synchronous logic circuits, or synchronous logic circuits, which derive their clock source from different clocks are in different clock domains.

Signals transferred between a first synchronous logic circuit in a first clock domain and a second synchronous logic circuit in a second clock domain are typically transferred asynchronously. One problem inherent in such a transfer is that a signal transferred from the first synchronous logic circuit may be in transition at the same time a clock signal for the second synchronous logic circuit triggers the memory element receiving the signal from the first synchronous logic circuit, thereby inducing metastability. One method to prevent an asynchronous signal arriving at the second logic circuit from being in transition during triggering of the second logic circuit is to use control signals in the form of a two-way handshake to synchronize the asynchronously transferred signal. Unfortunately, synchronizing signals transferred across a clock domain boundary can create timing delays. For example, data being transferred from a faster clock domain to a slower clock domain may have to be held down for a certain number of clock cycles (or "clock") while the logic in the slower clock domain prepares to receive the data.

Accordingly, it is desirable to have circuitry for transferring data between synchronous sequential logic circuits, each having their own clock domain, whereby metastability is avoided and timing delays associated with the transfer are reduced. Additionally, it is also desirable to have circuitry for transferring data between such synchronous sequential logic circuits without having the logic in either of the clock domains aware of the change in clock frequency or the ratio of clock frequencies.

SUMMARY OF THE INVENTION

It has been discovered that a gear box circuit can act as an interface for transferring data from a first clock domain to a second clock domain. The gear box circuit uses a level sensitive memory element coupled to an input selection circuit to receive data from logic in the first clock domain and provide the data to logic in the second clock domain. An input selection signal causes the selection circuit to select the input source for the level sensitive memory element, thereby allowing the proper signal to be provided as output to logic in the second clock domain. Additionally, the gear box can provide the proper output signal for logic in the second domain using circuitry to alternately mask the gear box output. The gear box receives control signals, including for example the input selection signal, from control circuitry. The logic in each clock domain does not have to be aware of the clock frequency on the other side of the gear box, nor does it need to be aware of the ratio of clock frequencies between clock domains. Consequently, the logic in each domain is simplified, the gear box circuit itself can be independent of the gear ratio (i.e., the ratio of clock frequencies), timing delays can be reduced, and metastability can be avoided.

Accordingly, one aspect of the present invention provides an apparatus for transferring data from a first clock domain to a second clock domain. The apparatus includes an input data path, a memory element, an input selection circuit, and an output path. The input data path is operable to receive data from the first clock domain. The memory element includes a data input terminal, an enable input terminal operable to receive a memory element enabling signal, and a data output terminal. The input selection circuit is coupled to the memory element, and includes an input selection circuit input terminal, and an input selection terminal operable to receive an input selection signal. An output signal at the data output terminal of the memory element is alternately responsive and non-responsive to an input signal applied to the input selection circuit input terminal depending upon the input selection signal and memory enabling signal. The output path is coupled to the data output terminal of the memory element and operable to provide the data to the second clock domain.

In another aspect of the invention, an integrated circuit includes a first clock domain circuit portion characterized by a first clock signal having a first frequency, a second clock domain circuit portion characterized by a second clock signal having a second frequency, and a gear box circuit for transferring data from the first clock domain circuit portion to the second clock domain circuit portion. The gear box circuit includes an input data path, a memory element, an input selection circuit, and an output path. The input data path is operable to receive data from the first clock domain circuit portion. The memory element includes a data input terminal, an enable input terminal operable to receive a memory element enabling signal, and a data output terminal. The input selection circuit is coupled to the memory element, and includes an input selection circuit input terminal, and an input selection terminal operable to receive an input selection signal. An output signal at the data output terminal of the memory element is alternately responsive and non-responsive to an input signal applied to the input selection circuit input terminal depending upon the input selection signal and memory enabling signal. The output path is coupled to the data output terminal of the memory element and operable to provide the data to the second clock domain circuit portion.

In still another aspect of the invention, a computer system includes a processor, a memory coupled to the processor, and a north-bridge circuit coupled to the processor and the memory. The north-bridge circuit includes a first clock domain circuit portion characterized by a first clock signal having a first frequency, a second clock domain circuit portion characterized by a second clock signal having a second frequency, and a gear box circuit for transferring data from the first clock domain circuit portion to the second clock domain circuit portion. The gear box circuit includes an input data path, a memory element, an input selection circuit, and an output path. The input data path is operable to receive data from the first clock domain circuit portion. The memory element includes a data input terminal, an enable input terminal operable to receive a memory element enabling signal, and a data output terminal. The input selection circuit is coupled to the memory element, and includes an input selection circuit input terminal, and an input selection terminal operable to receive an input selection signal. An output signal at the data output terminal of the memory element is alternately responsive and non-responsive to an input signal applied to the input selection circuit input terminal depending upon the input selection signal and memory enabling signal. The output path is coupled to the data output terminal of the memory element and operable to provide the data to the second clock domain circuit portion.

BRIEF DESCRIPTION OF THE DRAWINGS

The present invention may be better understood, and its numerous objects, features, and advantages made apparent to those skilled in the art by referencing the accompanying drawings.

DETAILED DESCRIPTION

In the following description, numerous specific details are set forth in order to provide a thorough understanding of the present invention. It will be obvious, however, to one having ordinary skill in the art that the present invention may be practiced without these specific details. In other instances, well-known circuits, structures and techniques have not been shown in detail in order not to unnecessarily obscure the present invention.

Figure 1:
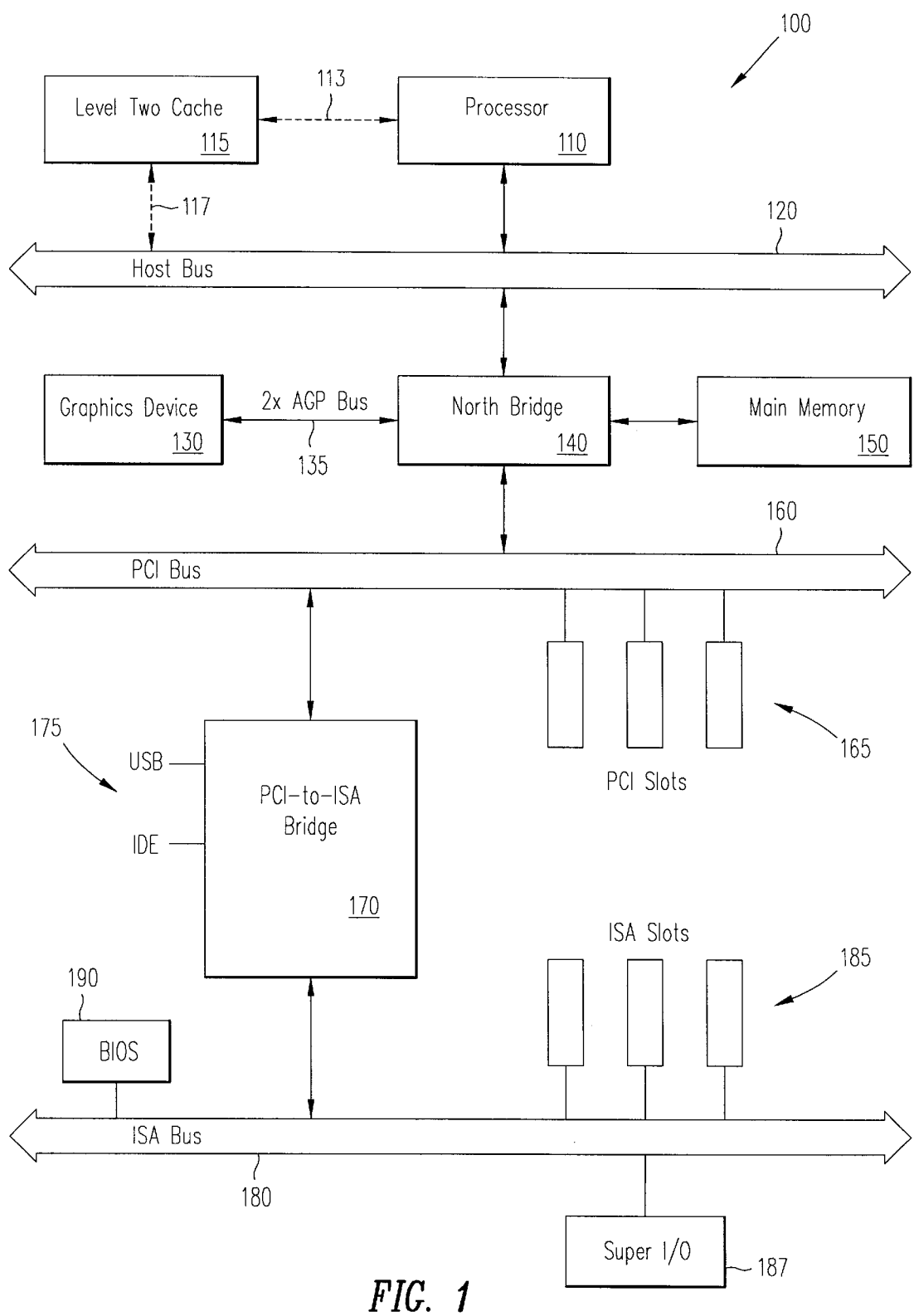
FIG. 1 is a block diagram of a computer system.

FIG. 1 illustrates a computer system 100 which is a simplified example of a computer system that includes a north bridge circuit 140 utilizing one or more gear box circuits. Computer system 100 includes processor 110 which is coupled to host bus 120, although more than one processor can be utilized. A level two (L2) cache memory 115 is coupled to processor 110 through either host bus 120 (via connection 117) or back-side bus 113. North bridge 140 is coupled to main memory 150, includes cache memory and main memory control functions, and provides bus control to handle transfers among PCI bus 160, processor 110, L2 cache 115, graphics device 130 (via AGP bus 135), main memory 150, and host bus 120. PCI bus 160 provides an interface for a variety of devices through PCI slots 165. PCI-to-ISA bridge 170 provides bus control to handle transfers between PCI bus 160 and ISA bus 180, IDE and universal serial bus (USB) functionality 175, and can include other finctional elements not shown, such as power management functionality, a real-time clock (RTC), DMA control, interrupt support, and system management bus support. Peripheral devices and input/output (I/O) devices (e.g., IrDA devices, floppy disk drives, serial port devices, parallel port devices) can be attached to various interfaces such as ISA slots 185 coupled to ISA bus 180. Alternatively, many I/O devices can be accommodated by a super I/O controller 187 coupled to ISA bus 180. Additionally, BIOS 190 is coupled to ISA bus 180, and incorporates the necessary processor executable code for a variety of low-level system functions and system boot functions.

Gear box circuitry or logic can be used wherever data is sent from one clock domain to another clock domain. For example, north bridge 140 typically exchanges data among at least three different clock domains including: a core clock (CCLK) domain which uses a clock for communication with the processor and/or memory, a peripheral clock (PCLK) domain which uses a clock for communication over a peripheral bus (e.g., the PCI bus), and an accelerated graphics port (AGP) clock (ACLK) domain which uses a clock for communication with graphics devices over the AGP bus. Additionally, the clock frequency in each of these domains can be chosen from a variety of different values. The CCLK is usually switchable between 66 MHz, 100 MHz, and 133 MHz, but other clock frequencies can be used. The PCLK can also be based on a variety of clock frequencies, but internal to the north bridge, PCLK is typically 66 MHz. AGP offers three different transfer modes (1x,2x, and 4x) which utilize three different transmitter/receiver clock rates: 66 MHz, 133 MHz, and 266 MHz, respectively. The various clock signals needed by the north bridge, or any circuit or circuits operating with two or more clock domains, can be provided by a phase-locked loop (PLL) that is either part of the north bridge, or a separate circuit. For the purposes of discussion below, emphasis will be placed on a north bridge implementation including a PLL. However, those having ordinary skill in the art will readily recognize that the devices and techniques described below can be used in a variety of digital circuits.

Figure 2A:
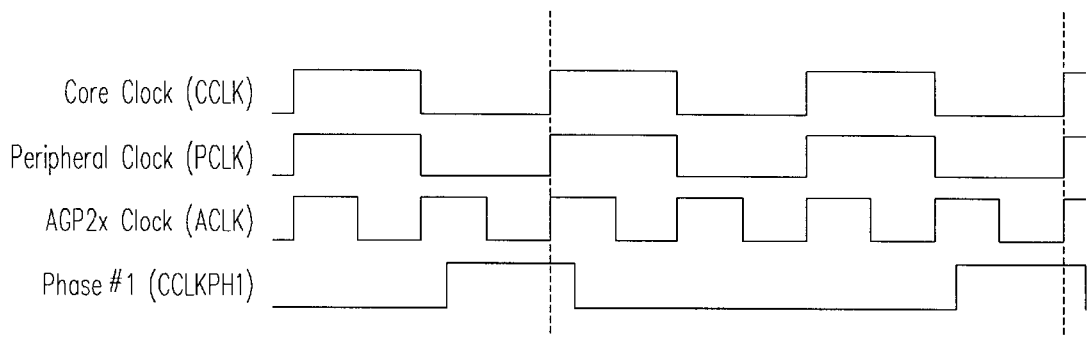
FIGS. 2A–2C show the signal CCLKPHl, which marks the common rising edge of the clock signals CCLK, PCLK, and ACLK, for three different combinations of ratios of clock frequencies.
Figure 2B:
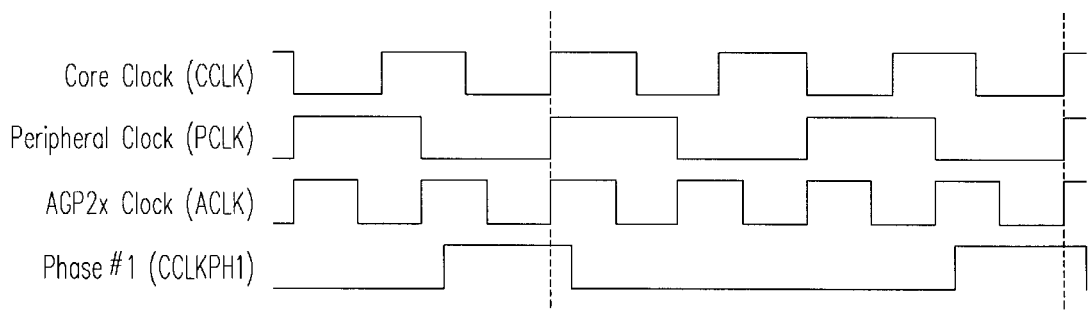
Figure 2C:
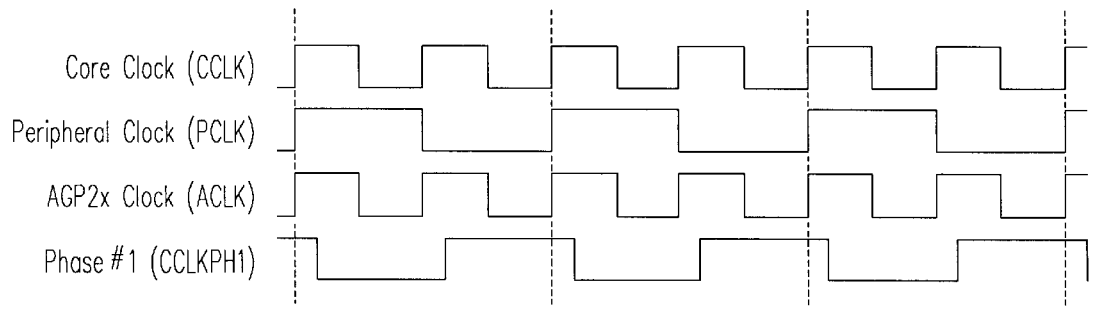

FIGS. 2A–2C show three different combinations of clock signal waveforms produced by a PLL associated with a north bridge circuit. In general, the PLL has two output clocks and a phase signal that can be distributed throughout the north bridge circuit. The first output clock, PCLK, runs at 66 MHz and is used by the sequencers and logic controlling the peripheral busses (e.g., the PCI and AGP busses). A standard PCI logic block runs internally at 66 MHz, and is static timed at that frequency. The external bus usually operates at half that speed, and signal conversion to and from the external bus speed is performed by clock enable logic at the bus interface. A section of the AGP logic block receives the 133 MHz clock that it needs (for 2x mode) based upon a doubled version of the PCLK. Every rising edge of the AGP 2x clock (ACLK) must align with an edge of the PCLK.

The second PLL output clock is the CCLK, which runs at 66 MHz, 100 MHz, or 133 MHz, depending on the system board and/or external configuration (e.g., inputs provided to the north bridge via a jumper or dual-inline-package (DIP) switch). CCLK may take on other, higher frequency values, but it will generally be a multiple of the PCLK, such as 1.0×, 1.5×, 2.0×, etc.

The PLL provides the three clock signals mentioned, CCLK, PCLK, and ACLK (which is based on PCLK) with a common rising edge, and that common rising edge is indicated by the phase 1 signal CCLKPH1. FIG. 2A illustrates the case where the core clock frequency and the peripheral clock frequency are the same (e.g., 66 MHz), and thus there is a common rising edge every CCLK/PCLK cycle. Note that because ACLK is derived from and twice the frequency of the PCLK, a common rising edge occurs every two AGP 2x clocks. FIG. 2B illustrates the case where CCLK and PCLK frequencies are 100 MHz and 66 MHz, respectively. Consequently, CCLKPH1 indicates that there is a common rising edge every three core clocks and every two peripheral clocks. Finally, FIG. 2C illustrates the case where the CCLK is 133 MHz and PCLK is 66 MHz. A common rising edge occurs every two core clocks, and every one peripheral clocks. In general, and as illustrated in FIGS. 2A–2C, the width of CCLKPH1 should be such that it is active before the common rising edge, and whenever it is sampled active on any of the clocks, CCLKPH1 indicates a single common rising edge, i.e., CCLKPH1 is not wide enough to coincide with more than one rising edge from each clock signal.

CCLKPH1 is used by a gear box module so that the module can synchronize signals that cross clock domains without loosing any extra clocks. Typically, CCLKPH1 is not used directly by the gear box module, but is used by the control logic supplying control signals to the gear box module. Limiting CCLKPH1s use to the control logic allows for fewer restrictions on routing delay and skew.

The examples discussed below will focus on situations where CCLK and PCLK are the two clock domains between which signals are transferred. However, it will readily be recognized by those having ordinary skill in the art that the techniques described can be used with a variety of different clock domains, not simply PCLK and CCLK.

Figure 3:
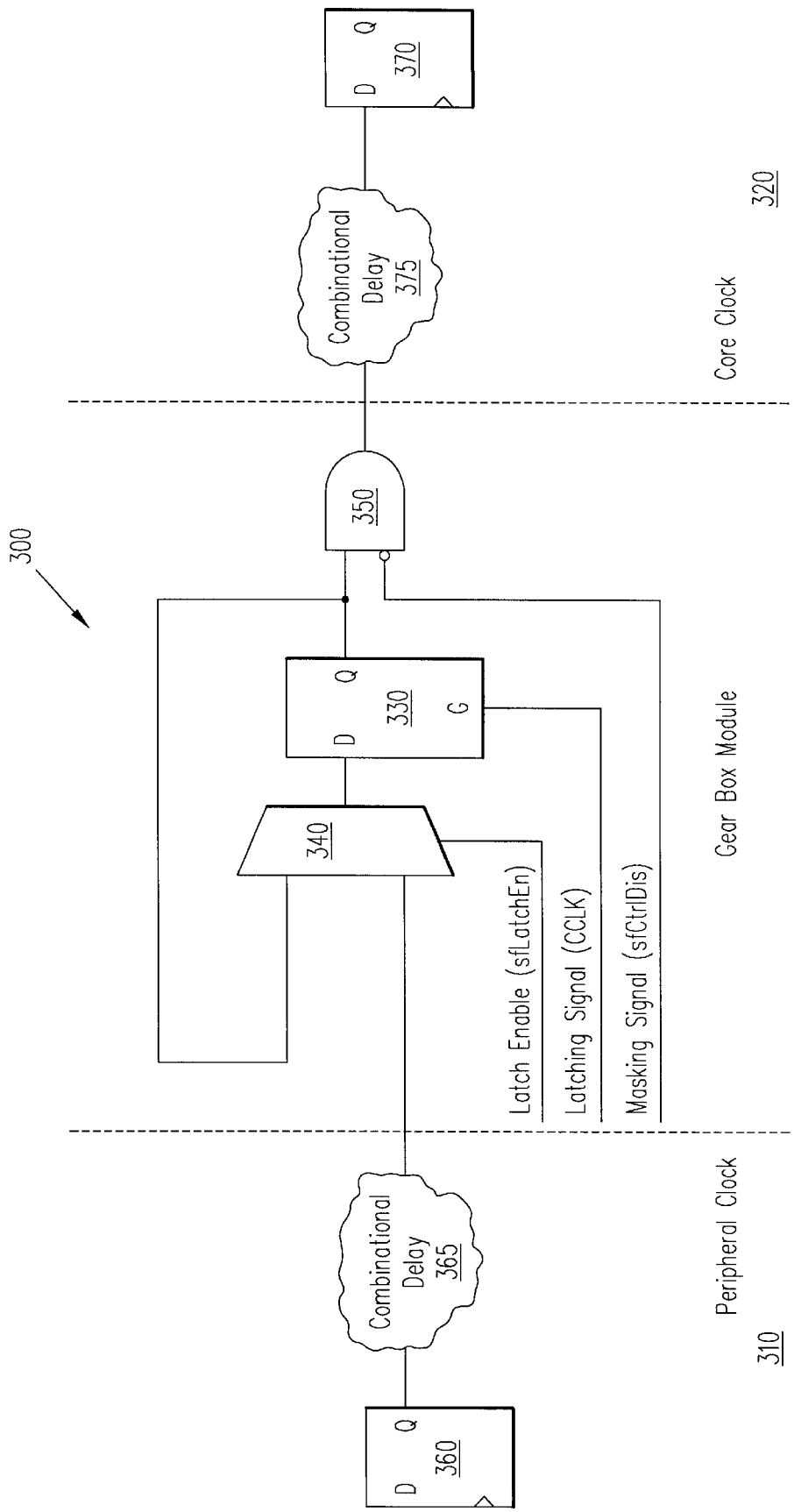
FIG. 3 is a block diagram of a gear box circuit located to transfer data from a peripheral (slower) clock domain to a core (faster) clock domain.

FIG. 3 is a block diagram of a gear box module 300 located to transfer data from a lower frequency clock domain 310 (in this case the peripheral clock domain) to a higher frequency clock domain 320 (in this case the core clock domain). In general, gear box module 300 is used to synchronize data across clock domains. The module uses information about the "gear ratio" (the ratio of the two clock domains) and/or control signals (produced by the gear box module itself, or by separate control logic) to determine when the signals crossing clock domains are to be latched. The module also uses control signals to determine when signals from the lower frequency clock domain need to be masked off so that they are not sampled more than once at the higher frequency. Latches, for example, latch 330, are the preferred memory element of the gear box module in order to reduce hold time problems.

Gear box module 300 includes latch 330, multiplexer (MUX) 340, and AND gate 350. Latch 330 serves as a memory element for receiving data on an input data path from lower frequency clock domain 310 and supplying the data on an output data path to higher frequency clock domain 320. MUX 340 serves as an input selection circuit which directs data from either lower frequency clock domain 310 or the output of latch 330 to the data input terminal of the latch, depending upon an input selection signal, e.g., latch enable signal (sfLatchEn). Latch 330 is "transparent," that is, its output follows its input, when the memory element enabling signal (latching signal CCLK) is active (e.g. CCLK is high), and the data from clock domain 310 gets latched when CCLK is inactive. During some core clocks, it is desirable to prevent the latched data from changing, because, for example, data is not transferred on every clock cycle. This is accomplished by using MUX 340 to switch the input source from clock domain 310 to the output of latch 330. Note that although MUX 340 provides an input selection circuit, other circuits could be used. For example, MUX 340 and latch 330 could be replaced by a latch with two enables. The output from latch 330 is coupled to AND gate 350 which serves as masking logic, and receives a masking signal (sfCtrlDis). When the signal being passed through the gear box module is a control signal (as opposed to actual data), the masking logic serves to mask off the output to clock domain 320 thereby preventing the signal from being sampled more than once. If the signal being passed through the gear box module is actual data (qualified with some other signal), then the signal need not be masked off. Flip-flops 360 and 370, as well as combinational delays 365 and 375 illustrate digital circuitry present in the two clock domains.

Control signals sfLatchEn and sfCtrlDis are generated by control logic which can be part of the gear box module (not shown) or which can be separate from the gear box module. See, for example FIGS. 7 and 8A–8B. In circuits where multiple gear box modules having the same gear ratio are used, it may be preferable to have a single set of control logic circuits provide the control signals to each of the gear box modules. In general, latch 330 holds data during the second half of the faster clock, i.e., when the faster clock is low, so that if there is a skew between the clocks in the two domains and the data off the slower clock changes before the faster clock, the change is not seen on the faster clock domain until the next clock, and hold time problems are thereby reduced.

Figure 4A:
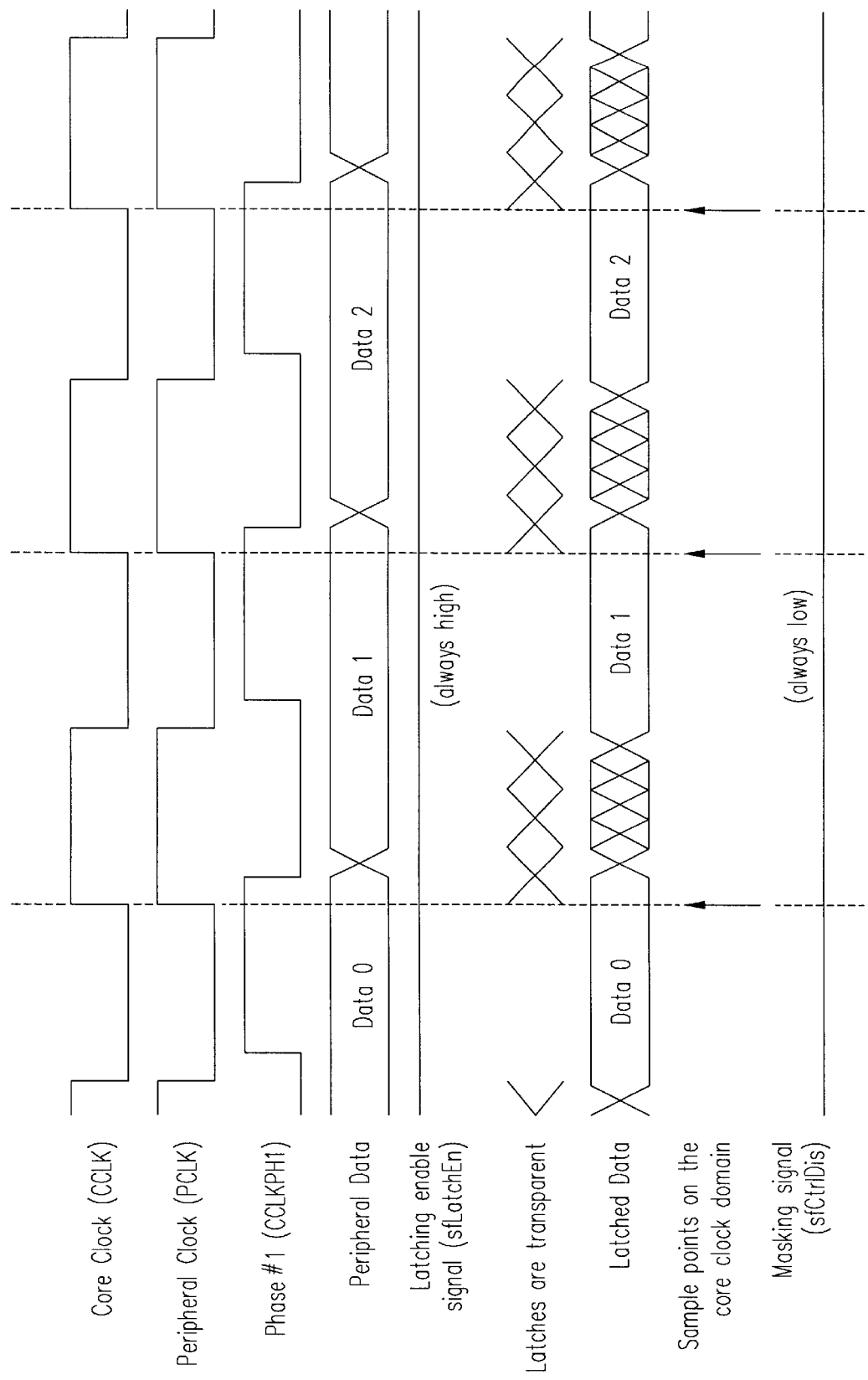
FIGS. 4A–4C are timing diagrams associated with the gear box circuit of FIG. 3. Each of the figures illustrates the timing of signals for a different combination of core clock and peripheral clock ratios.
Figure 4B:
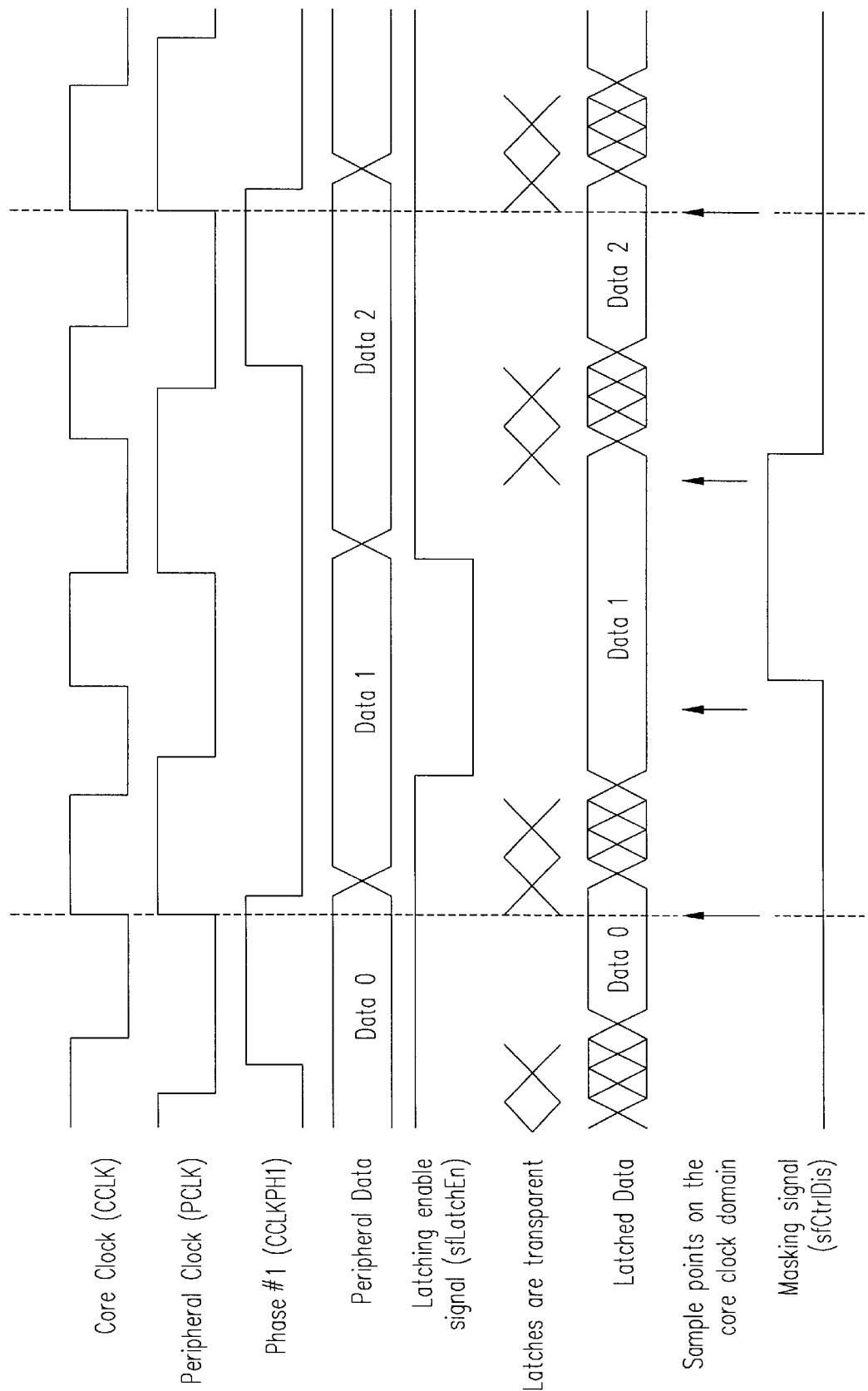
Figure 4C:
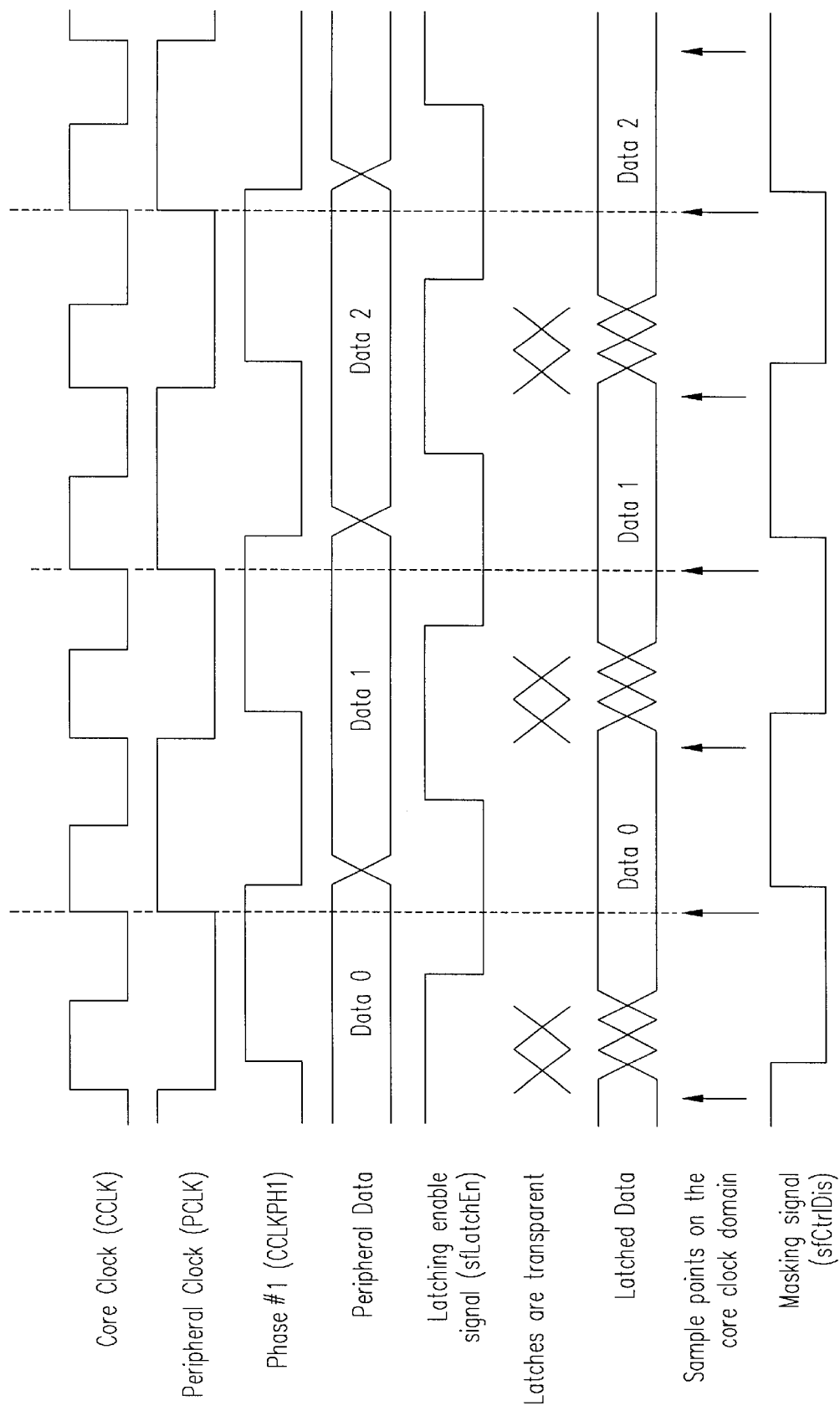

FIGS. 4A–4C are timing diagrams showing waveforms for the signals passing through gear box module 300 and the signals used to control the gear box module.

FIG. 4A illustrates an example where the ratio between the clock of the higher frequency clock domain 320 and that of the lower frequency clock domain 310 is 1.0, that is CCLK and PCLK are the same frequency. Although this is not, strictly speaking, an example of a signal passing from a lower frequency clock domain to a higher frequency clock domain, it is included here because, as noted above, CCLK is very likely to be one of a variety of multiples of PCLK, and also because it further illustrates the function of MUX 340 and AND gate 350. Because CCLK and PCLK have the same frequency, CCLKPH1 occurs once every CCLK/PCLK. Data arriving from clock domain 310 is shown as Peripheral Data, and is illustrated as being slightly delayed with respect to PCLK. Since the two clock domains have the same frequency, there is no need to ensure that the latched data does not change during some of the core clocks, and so the input selection signal sfLatchEn is always active (in this example active high) so that the output from MUX 340 is always the signal from clock domain 310. The next waveform indicates that latch 330 is transparent during the first half of each CCLK, while the subsequent waveform shows the latched data of the gear box module. The arrows indicate points where logic in clock domain 320 samples the latched data, and coincide with rising edges of CCLK. Since the frequencies of the two clock domains are the same, there is no danger that data representing control signals will be sampled more than once, and so the masking logic (in this case AND gate 350) is disabled by keeping sfCtrlDis always low.

FIG. 4B illustrates an example where the ratio between the clock of the higher frequency clock domain 320 and that of the lower frequency clock domain 310 is 1.5, for example CCLK is 100 MHz and PCLK 66 MHz. Because of the 1.5 gear ratio, CCLKPH1 occurs once every three CCLKs and two PCLKs. Data arriving from clock domain 310 is shown as Peripheral Data, and is illustrated as being slightly delayed with respect to PCLK. The signal from clock domain 310 (Peripheral Data) must satisfy a setup time condition, that is it must be stable for a time $t_{setup}$ before latch 330 closes. However, because of the difference in clock frequencies, there will be instances when there may not be sufficient setup time. Consequently, gear box module 300 holds the current latched value through another core clock. This is accomplished when MUX 340 switches the input to latch 330 from the Peripheral Data being delivered from clock domain 310 to the output of latch 330. MUX 340 switches the inputs to latch 330 when sfLatchEn becomes inactive, and sfLatchEn is generated by control logic based upon the CCLKPH1 and information about the gear ratio. In this example, sfLatchEn goes inactive after a CCLK falling edge that immediately follows a CCLK rising edge that coincides with a PCLK rising edge, as indicated by CCLKPH1. To ensure sufficient setup time, sfLatchEn remains inactive for one CCLK period. As illustrated by the sixth line of the figure, because of the input selection circuit (MUX 340), latch 330 is not transparent during a period of time when the latch would otherwise be transparent. The arrows indicate points where logic in clock domain 320 samples the latched data, and coincide with rising edges of CCLK. Because of the difference in clock domains, the same latched data could be sampled twice by logic in clock domain 320. Consequently, masking logic is enabled by the masking signal sfCtrlDis, thereby preventing logic in clock domain 320 from sampling the same data twice. Examples of control logic for the production of the signals sfLatchEn and sfCtrlDis can be found in FIGS. 8A and 8B, respectively, and are further described below.

FIG. 4C illustrates an example where the ratio between the clock of the higher frequency clock domain 320 and that of the lower frequency clock domain 310 is 2.0, for example CCLK is 133 MHz and PCLK 66 MHz. Because of the 2.0 gear ratio, CCLKPH1 occurs once every two CCLKs and every one PCLK. Data arriving from clock domain 310 is shown as Peripheral Data, and is illustrated as being slightly delayed with respect to PCLK. Gear box module 300 holds the current latched value of Peripheral Data through the first half of each CCLK that follows the rising edge of a CCLK coinciding with the rising edge of a PCLK, as indicated by CCLKPH1. As noted above, this is accomplished when MUX 340 switches the input to latch 330 from the Peripheral Data being delivered from clock domain 310 to the output of latch 330, based on the control signal sfLatchEn. In this example, sfLatchEn goes inactive after a CCLK falling edge that immediately precedes a CCLK rising edge that coincides with a PCLK rising edge, as indicated by CCLKPH1. To ensure sufficient setup time, sfLatchEn remains inactive for one CCLK period. The sixth line of the figure indicates those periods when latch 330 is transparent. The arrows indicate points where logic in clock domain 320 samples the latched data, and coincide with rising edges of CCLK. Because of the difference in clock domains, the same latched data could be sampled twice by logic in clock domain 320. Consequently, masking logic is enabled by the masking signal sfCtrlDis, thereby preventing logic in clock domain 320 from sampling the same data twice.

The schemes illustrated above favor circuits which include large combinational delays (e.g., 365 and 375). However, if the combinational delays are small, and the higher frequency clock domain is, for example, twice the frequency of the lower frequency clock domain, it is possible to generate the masking signal one clock earlier. This could reduce the latency associated with gear box operation by one clock cycle of the higher frequency clock. However, this approach can also complicate the gear box module design because the gear box module would need to have information about the logic that passes through it. Consequently, the reduced latency scheme should only be used when the time savings justifies the additional complexity required of the gear box module.

In planning for the timing characteristics for data transfers from a lower frequency clock domain to a higher frequency clock domain, the module operating at the lower clock frequency is usually static timed to run at that frequency. In a preferred embodiment, the signal that is being sent to the higher frequency clock domain should not have much logic after flip-flop 360. The combinational logic after flip-flop 360 (associated with combinational delay 365) should meet the setup time of the closing edge of latch 330. In general, this would be half of the higher frequency clock period minus the skew between the two clock domains. Accordingly, it is preferred that the combinational logic be limited to several gate stages, depending on, for example, process technology and frequency of the higher frequency clock.

Where the lower frequency clock is PCLK and the higher frequency clock is CCLK, the timing requirements for the PCLK side of latch 330 can more thoroughly be described by:

$$(PCLK\ out)+(PComb.\ Delay)+(Latch\ Setup)<\tfrac{1}{2}(CCLK\ period)-(PCLK-CCLK\ skew)-(PLL\ jitter)-(margin), \quad (1)$$

and the timing requirements for the CCLK side of latch 330 can more thoroughly be described by:

$$(Latch\ Out)+(C\ Comb.\ Delay)+(C\ Flop\ Setup)<(CCLK\ period)-(PCLK-CCLK\ skew)-(PLL\ jitter)-(margin). \quad (2)$$

In the equations above, PCLK out is the delay between flip-flop 360 and combinational delay 365; P Comb. Delay and C. Comb. Delay are delays 375 and 365, respectively; Latch Setup and C Flop Setup are the setup times for latch 330 and flip-flop 370, respectively; PLL jitter is the phase jitter associated with the PLL; and margin is some predetermined margin of error for timing.

The preceding examples were all based upon signals being transferred from a lower frequency clock domain to a higher frequency clock domain. However, transferring signals from a higher frequency domain to a lower frequency domain must also be accommodated, while addressing the problems associated with such a signal transfer. For example, when sending a signal from a higher frequency clock domain to a lower frequency clock domain, the signal may not get sampled at all by logic in the lower frequency clock domain.

Figure 5:
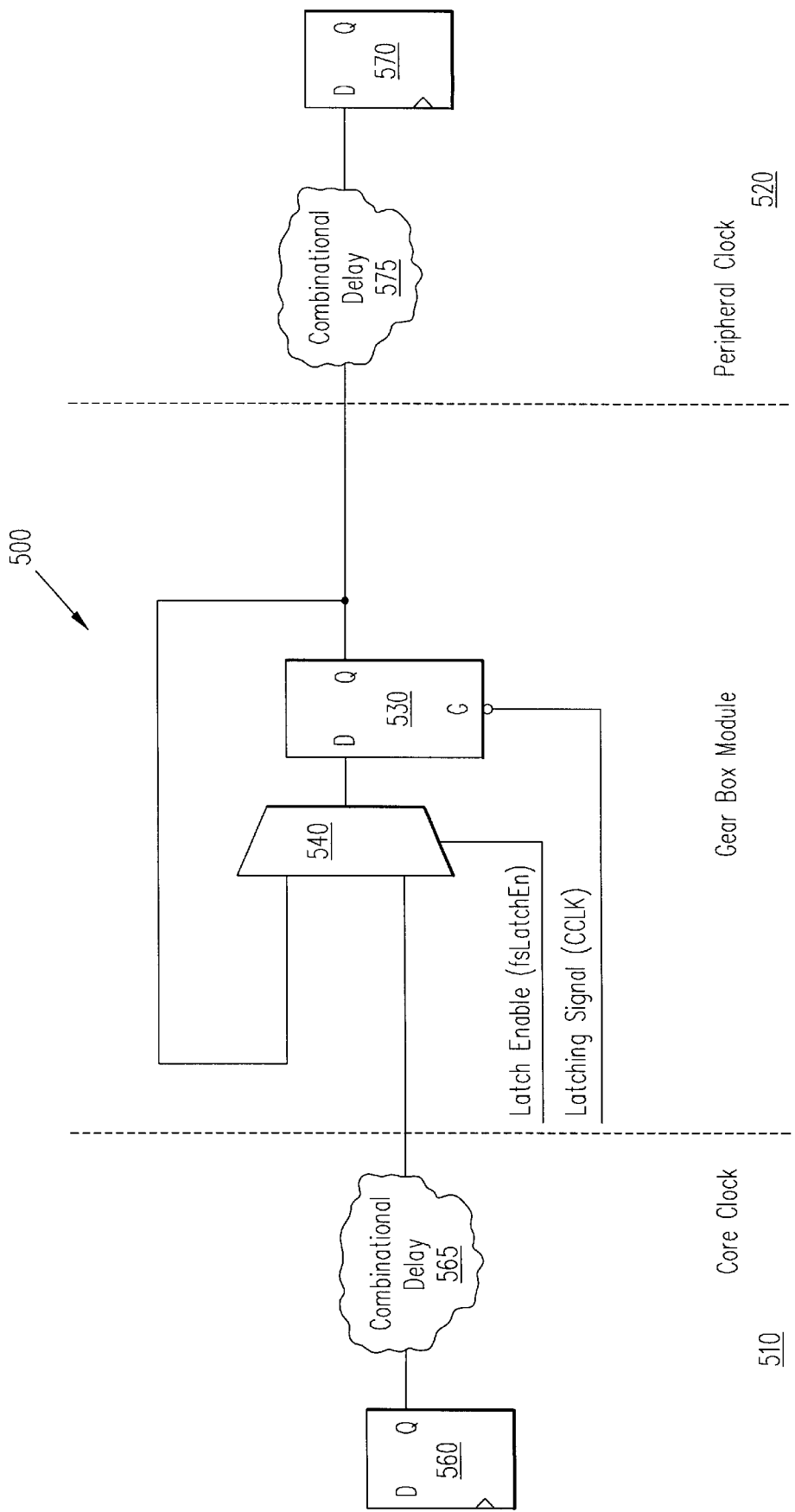
FIG. 5 is a block diagram of a gear box circuit located to transfer data from a core (faster) clock domain to a peripheral (slower) clock domain.

FIG. 5 is a block diagram of a gear box module 500 located to transfer data from a higher frequency clock domain 510 (in this case the core clock domain) to a lower frequency clock domain 520 (in this case the peripheral clock domain). As with gear box module 300, module 500 uses control signals to determine when the signals crossing clock domains are to be latched. Gear box module 500 does not include masking logic (e.g. AND gate 350) because such logic is unnecessary where signals are being transferred from a higher to a lower frequency clock domain given that there is no danger that the same data will be sampled twice by logic in the lower frequency domain.

Gear box module 500 includes latch 530, and multiplexer (MUX) 540. Latch 530 serves as a memory element for receiving data on an input data path from higher frequency clock domain 510 and supplying the data on an output data path to lower frequency clock domain 520. MUX 540 serves as an input selection circuit which directs data from either higher frequency clock domain 510 or the output of latch 530 to the data input terminal of the latch, depending upon an input selection signal, e.g., latch enable signal (fsLatchEn). Latch 530 is "transparent," that is, its output follows its input, when the memory element enabling signal (latching signal CCLK) is inactive (e.g. CCLK is low), and the data from clock domain 510 gets latched when CCLK is active (e.g., on the rising edge of CCLK). Note the bobble on latch 530. Because data is sampled at a lower clock frequency, it is desirable to prevent the latched data from changing. This is accomplished by using MUX 540 to switch the input source from clock domain 510 to the output of latch 530. Note that although MUX 540 provides an input selection circuit, other circuits could be used. For example, MUX 540 and latch 530 could be replaced by a latch with two enables. Output from latch 540 is passed to lower frequency clock domain 520. Flip-flops 560 and 570, as well as combinational delays 565 and 575 illustrate digital circuitry present in the two clock domains.

Control signal fsLatchEn is generated by control logic which can be part of the gear box module (not shown) or which can be separate from the gear box module. For an example of logic designed to generate a similar control signal, see FIGS. 7 and 8A and the description associated with those figures.

Additionally, when passing data from the higher frequency clock domain to the lower frequency clock domain, some data can be lost. Thus, where data from the higher frequency clock domain changes with every clock, and the clock speed cannot be reduced ("throttled"), a first-in-first-out buffer (FIFO) should be used between the two domains (not shown). For example, the FIFO could operate on the higher frequency clock domain with a gear box module located between the FIFO and the slower clock domain.

Figure 6A:
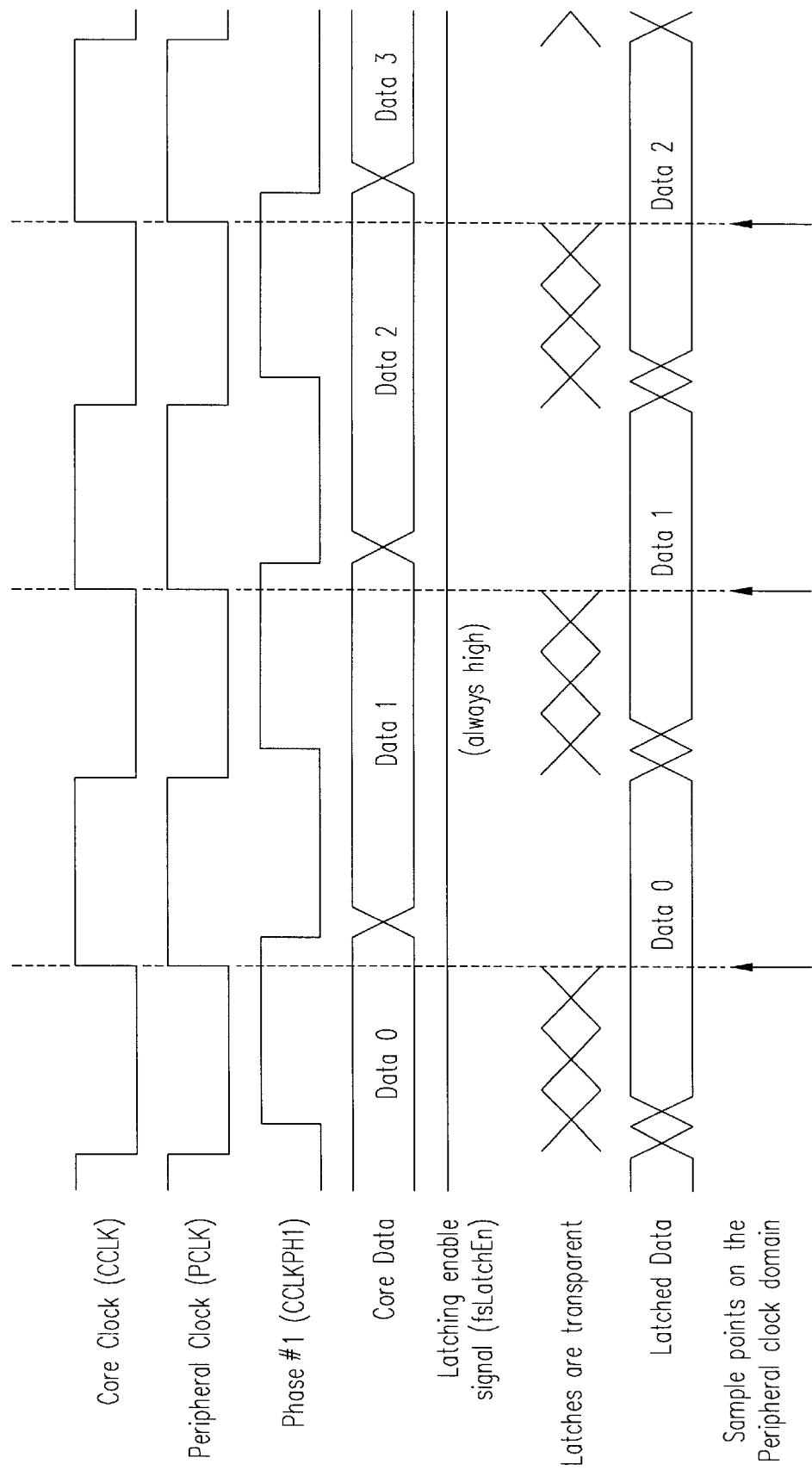
FIGS. 6A–6C are timing diagrams associated with the gear box circuit of FIG. 5. Each of the figures illustrates the timing of signals for a different combination of core clock and peripheral clock ratios.

FIG. 6A illustrates an example where the ratio between the clock of the higher frequency clock domain 510 and that of the lower frequency clock domain 520 is 1.0, that is CCLK and PCLK are the same frequency. Although this is not, strictly speaking, an example of a signal passing from a higher frequency clock domain to a lower frequency clock domain, it is included here because, CCLK is very likely to be one of a variety of multiples of PCLK, and also because it further illustrates the function of MUX 540. Because CCLK and PCLK have the same frequency, CCLKPH1 occurs once every CCLK/PCLK. Data arriving from clock domain 510 is shown as Core Data, and is illustrated as being slightly delayed with respect to CCLK.

Since the two clock domains have the same frequency, there is no need to ensure that the latched data does not change during some of the core clocks, and so the input selection signal sfLatchEn is always active (in this example active high) so that the output from MUX 540 is always the signal from clock domain 510. In this case, gear box module 530 is used to avoid hold time problems due to different clock insertion delays in the two clock trees. The next waveform indicates that latch 530 is transparent during the second half of each CCLK, while the next waveform shows the latched data of the gear box module. The arrows indicate points where logic in clock domain 520 samples the latched data, and coincide with rising edges of PCLK.

Figure 6B:
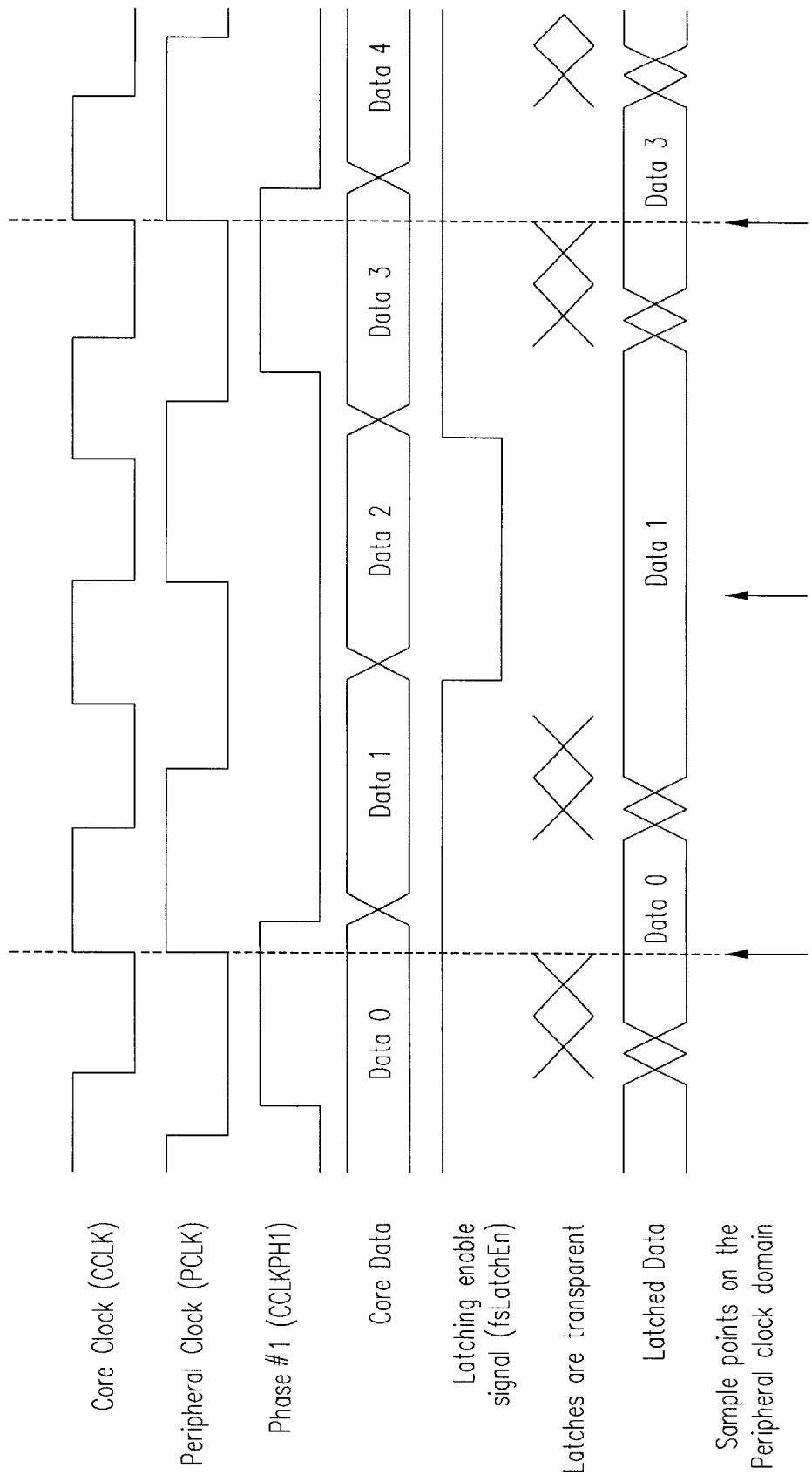

FIG. 6B illustrates an example where the ratio between the clock of the higher frequency clock domain 510 and that of the lower frequency clock domain 520 is 1.5, for example CCLK is 100 MHz and PCLK 66 MHz. Because of the 1.5 gear ratio, CCLKPH1 occurs once every three CCLKs and two PCLKs. Data arriving from clock domain 510 is shown as Core Data, and is illustrated as being slightly delayed with respect to CCLK. Since some data sampled from the lower frequency clock domain will be missed, latch 530 holds the data during the entire CCLK period following the CCLK that has a rising edge coinciding with a rising edge of PCLK, as indicated by CCLKPH1. This is accomplished when MUX 540 switches the input to latch 530 from the Core Data being delivered from clock domain 510 to the output of latch 530. MUX 540 switches the inputs to latch 530 when fsLatchEn becomes inactive, and fsLatchEn is generated by control logic based upon the CCLKPH1 and information about the gear ratio. In this example, fsLatchEn goes inactive after a CCLK rising edge that immediately follows a CCLK rising edge that coincides with a PCLK rising edge, as indicated by CCLKPH1. To ensure sufficient setup time, sfLatchEn remains inactive for one CCLK period. As illustrated by the sixth line of the figure, because of the input selection circuit (MUX 540), latch 530 is not transparent during a period of time when the latch would otherwise be transparent. The latched data that is sampled by logic in clock domain 520 remains stable for half a core clock after the edges, thereby taking care of the differences in the insertion delays of the two clock trees. The arrows indicate points where logic in clock domain 520 samples the latched data, and coincide with rising edges of PCLK. Note that Data2 is not seen in clock domain 520 and the logic in clock domain 510 should be aware that when fsLatchEn is not active, the data should not be changed, otherwise it will be lost.

Figure 6C:
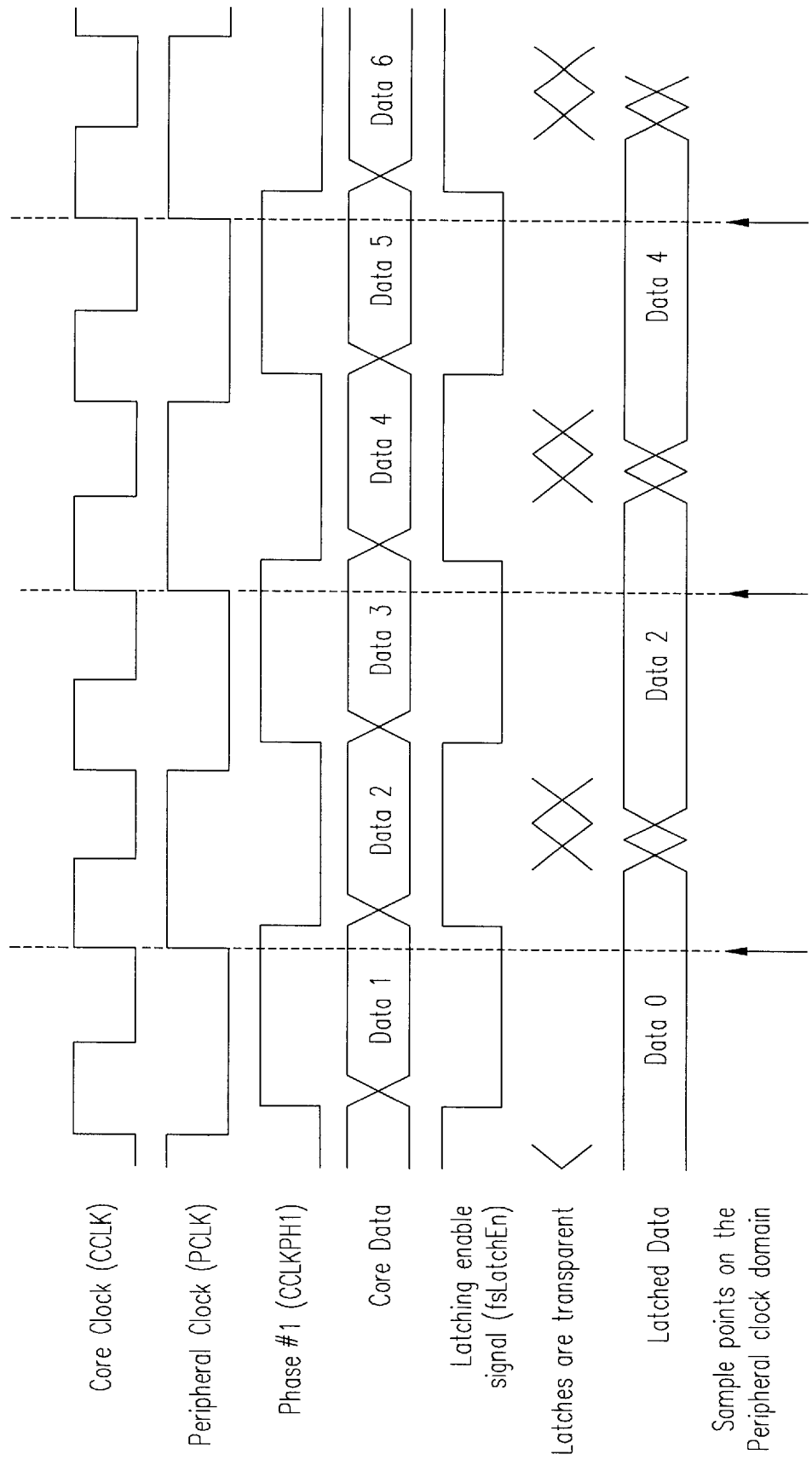

FIG. 6C illustrates an example where the ratio between the clock of the higher frequency clock domain 510 and that of the lower frequency clock domain 520 is 2.0, for example CCLK is 133 MHz and PCLK 66 MHz. Because of the 2.0 gear ratio, CCLKPH1 occurs once every two CCLKs and every one PCLK. Data arriving from clock domain 510 is shown as Core Data, and is illustrated as being slightly delayed with respect to PCLK. Gear box module 500 holds the current latched value of Core Data through the first half of each CCLK that follows the rising edge of a CCLK coinciding with the rising edge of a PCLK, as indicated by CCLKPH1. This is accomplished when MUX 540 switches the input to latch 530 from the Core Data being delivered from clock domain 510 to the output of latch 530, based on the control signal sfLatchEn. In this example, sfLatchEn goes inactive after a CCLK rising edge that immediately precedes a CCLK rising edge that coincides with a PCLK rising edge, as indicated by CCLKPH1. To ensure sufficient setup time, sfLatchEn remains inactive for one CCLK period. The sixth line of the figure indicates those periods when latch 530 is transparent. The arrows indicate points where logic in clock domain 520 samples the latched data, and coincide with rising edges of PCLK. Data being sent from clock domain 510 is lost every other clock, and so the logic in clock domain 510 should provide for this condition.

The amount of logic on either side of gear box module 500 should be kept low. Signals driven off the higher frequency clock should be stable at the point at which the latch 530 becomes transparent (e.g., when CCLK is low). This helps to provide enough time on the other side of the latch. Generally, the time should be kept to half a CCLK period minus any skew between the two clock domains. As far as possible, the logic on the clock domain 510 side of latch 530 should be limited to four to six gate stages. Once latch 530 goes transparent, data out of the latch is passed onto clock domain 520, and the logic on the that side of the latch should limited to two to four gate stages.

Where the lower frequency clock is PCLK and the higher frequency clock is CCLK, the timing requirements for the CCLK side of latch 530 can more thoroughly be described by:

$$(CCLK\ out)+(C\ Comb.\ Delay)+(Latch\ Setup)<\tfrac{1}{2}(CCLK\ period)-(PCLK-CCLK\ skew)-(PLL\ jitter)-(margin), \quad (3)$$

and the timing requirements for the PCLK side of latch 530 can more thoroughly be described by:

$$(Latch\ Out)+(P\ Comb.\ Delay)+(P\ Flop\ Setup)<\tfrac{1}{2}(CCLK\ period)-(PCLK-CCLK\ skew)-(PLL\ jitter)-(margin). \quad (2)$$

When performing timing analysis on a complete integrated circuit that uses gear box modules, e.g., a north bridge, one of the worst conditions for the higher frequency to lower frequency gear box is during the higher frequency clock period prior to the point where the two clocks have a common leading edge. To help ensure that the circuit operates at full frequency, full circuit timing analysis should be repeated with the clocks setup to produce the above condition.

Figure 7:
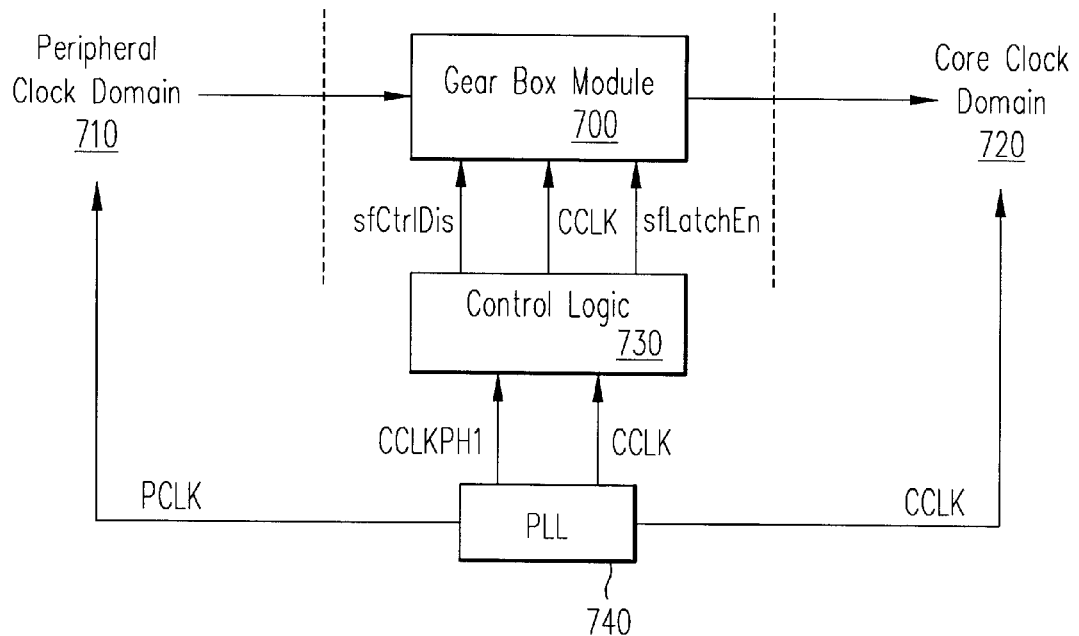
FIG. 7 is a block diagram illustrating a gear box circuit and associated circuits for providing control signals.

FIG. 7 illustrates a gear box module 700 located between PCLK domain 710 and CCLK domain 720, similar to the gear box module illustrated in FIG. 3. FIG. 7 illustrates how a single piece of control logic 730 and a PLL 740 can provide the necessary control signals to gear box module 700. PLL 740 produces CCLK, PCLK and CCLKPH1 signals and supplies appropriate signals to logic in each of the clock domains 710 and 720, as well as to control logic 730. Note that PLL 740 can also supply other signals, for example an ACLK signal, to other portions of the circuit, and may also provide the same signal to multiple instances of the same clock domain in a single circuit. Control logic 730 uses the received signals to produce the control signals needed by gear box module 700. Where multiple gear box modules are present between similar clock domains, control logic 730 can provide control signals to each of the gear box modules, thereby adding design efficiency. Also, for those gear box modules transferring signals from a higher frequency clock domain to a lower frequency clock domain, control logic 730 would not provide a signal comparable to sfCtrlDis, because it would not be needed.

Figure 8A:
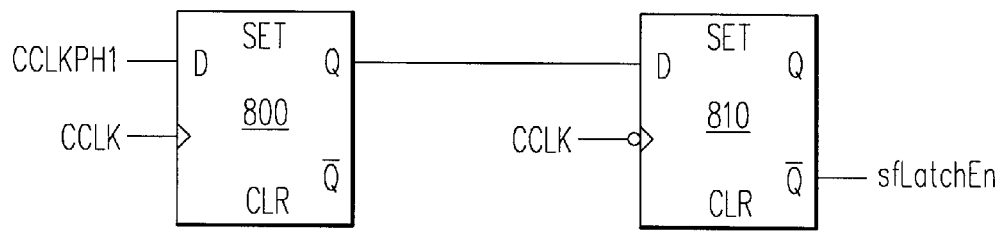
FIGS. 8A–8B are block diagrams of circuits that can be used to provide the control signals sfLatchEn and sfCtrlDis, respectively.
Figure 8B:
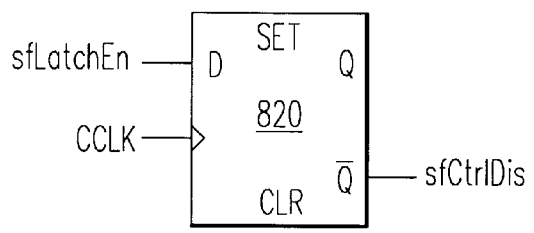

FIGS. 8A and 8B illustrate examples of digital logic that can be used to generate the gear box module control signals sfLatchEn and sfCtrlDis. The logic in FIGS. 8A and 8B is designed specifically for a situation, like that illustrated in FIG. 4B, where the signal is being transferred from a lower frequency clock domain to a higher frequency clock domain, and the gear ratio is 1.5. D-type flip-flop 800 receives the CCLK on its clock input, and CCLKPH1 on its data input. Since flip-flop 800 is rising edge triggered, the output value remains until the next rising edge. Thus, when the rising edges of CCLK and PCLK coincide, CCLKPH1 is active, and the output of flip-flop 800 remains active until the next rising edge of CCLK, where it becomes inactive. D-type flip-flip 810 is falling edge triggered on CCLK., and receives the output of flip-flop 800 on its input data line. The inverted output of flip-flop 810 provides the signal sfLatchEn. FIG. 8B shows that another D-type flip-flop 820, which is rising edge triggered and receives sfLatchEn as input produces sfCtrlDis at its inverted output.

FIGS. 8A and 8B illustrate one example of logic that can be used to produce the control signals needed for a gear box module operating with a 1.5 gear ratio between a lower and higher frequency domains. Those having ordinary skill in the art will readily recognize that a variety of different logic designs can be implemented to yield the desired control signals for the specific example of FIG. 4B, for the signals illustrated in FIG. 4A, 4C, and 6A–6C, and for any other desired gear ratio.

The latches described are generally illustrated as D-type latches, but a variety of devices designed to hold a set output value can be used. Thus, "latch" should be given its broadest meaning and not be read to include only those devices where the output follows the input when enabled (or activated) and hold the last value when disabled.

Regarding terminology used herein, it will be appreciated by one skilled in the art that any of several expressions may be equally well used when describing the operation of a circuit including the various signals and nodes within the circuit. Any kind of signal, whether a logic signal or a more general analog signal, takes the physical form of a voltage level (or for some circuit technologies, a current level) of a node within the circuit. It may be correct to think of signals being conveyed on wires or buses. For example, one might describe a particular circuit operation as "the output of circuit 10 drives the voltage of node 11 toward VDD, thus asserting the signal OUT conveyed on node 11." This is an accurate, albeit somewhat cumbersome expression. Consequently, it is well known in the art to equally describe such a circuit operation as "circuit 10 drives node 11 high," as well as "node 11 is brought high by circuit 10," "circuit 10 pulls the OUT signal high" and "circuit 10 drives OUT high." Such shorthand phrases for describing circuit operation are more efficient to communicate details of circuit operation, particularly because the schematic diagrams in the figures clearly associate various signal names with the corresponding circuit blocks and node names. For convenience, an otherwise unnamed node conveying the CLK signal may be referred to as the CLK node. Similarly, phrases such as "pull high," "drive high," and "charge" are generally synonymous unless otherwise distinguished, as are the phrases "pull low," "drive low," and "discharge." It is believed that use of these more concise descriptive expressions enhances clarity and teaching of the disclosure. It is to be appreciated by those skilled in the art that each of these and other similar phrases may be interchangeably used to describe common circuit operation, and no subtle inferences should be read into varied usage within this description.

As an additional example, a logic signal has an active level and an inactive level (at least for traditional binary logic signals) and the active and inactive levels are sometimes also respectively called active and inactive "states." The active level for some logic signals is a high level (i.e., an "active-high" signal) and for others is a low level (i.e., an "active-low" signal). A logic signal is "asserted" or "activated" when driven to the active level. Conversely, a logic signal is "de-asserted" or "de-activated" when driven to the inactive level. A high logic level is frequently referred to as a logic "1" and a low logic level is frequently referred to as a logic "0" (at least for positive logic).

While the invention has been described in light of the embodiments discussed above, one skilled in the art will recognize that certain substitutions may be easily made in the circuits without departing from the teachings of this disclosure. For example, a variety of logic gate structures may be substituted for those shown, and still preserve the operation of the circuit. In particular, a NAND gate may be replaced by a NOR gate by appropriate polarity changes of the various signals, in accordance with DeMorgan's law. Moreover, an inverted output of a flip-flop may be used rather than the non-inverted output, again with appropriate polarity changes of the various signals. Also, many circuits using NMOS transistors may be implemented using PMOS transistors instead, as is well known in the art, provided the logic polarity and power supply potentials are reversed. In this vein, the transistor conductivity-type (i.e., N-channel or P-channel) within a CMOS circuit may be frequently reversed while still preserving similar or analogous operation.

The description of the invention set forth herein is illustrative and is not intended to limit the scope of the invention as set forth in the following claims. Variations and modifications of the embodiments disclosed herein may be made based on the description set forth herein, without departing from the scope and spirit of the invention as set forth in the following claims.

What is claimed is:

1. An apparatus for transferring data from a first clock domain to a second clock domain comprising:
   an input data path operable to receive data from the first clock domain;
   a memory element including:
      a data input terminal;
      an enable input terminal operable to receive a memory element enabling signal; and
      a data output terminal;
   an input selection circuit coupled to the memory element, the input selection circuit including:
      an input selection circuit input terminal; and
      an input selection terminal operable to receive an input selection signal wherein an output signal at the data output terminal of the memory element is alternately responsive and non-responsive to an input signal applied to the input selection circuit input terminal depending upon the input selection signal and memory enabling signal; and
   an output path coupled to the data output terminal of the memory element and operable to provide the data to the second clock domain.

2. The apparatus of claim 1 wherein the memory element is a latch.

3. The apparatus of claim 2 wherein the latch is a D-type latch.

4. The apparatus of claim 1 wherein the memory element and the input selection circuit together form a two-enable-terminal latch wherein:

the input selection circuit input terminal is the data input terminal of the memory element;

the enable input terminal is a first enable terminal of the two-enable-terminal latch; and the input selection terminal is a second enable terminal of the two-enable-terminal latch.

5. The apparatus of claim 4 wherein the input data path is coupled to the data input terminal of the memory element.

6. The apparatus of claim 1 wherein the input selection circuit is a multiplexer (MUX) including:

a first MUX input terminal coupled to the data output terminal of the memory element;

a second MUX input terminal coupled to the input data path, the second MUX input terminal being the input selection circuit input terminal;

a MUX select input terminal, wherein the MUX select input terminal is the input selection terminal; and a MUX output terminal coupled to the data input terminal of the memory element.

7. The apparatus of claim 6 wherein the MUX provides one of the input signal and the output signal to the input terminal of the memory element depending upon the input selection signal applied to the MUX select input terminal.

8. The apparatus of claim 1 wherein the memory element enabling signal is one of a clock signal from the first clock domain and a clock signal from the second clock domain.

9. The apparatus of claim 8 wherein the memory element enabling signal is the one of the clock signal from the first clock domain and the clock signal from the second clock domain having a higher frequency.

10. The apparatus of claim 1 further comprising masking logic coupled between the output path and the data output terminal of the memory element, the masking logic including a masking logic input terminal operable to receive a masking signal, the masking logic selectively providing the output signal to the output path depending upon the masking signal.

11. The apparatus of claim 10 wherein the masking logic is an AND gate, the data output terminal of the memory element being coupled to a first input terminal of the AND gate, the masking logic input terminal being a second input terminal of the AND gate, and an output terminal of the AND gate being coupled to the output path.

12. The apparatus of claim 10 wherein:

the first clock domain is characterized by a first clock signal having a first frequency and the second clock domain is characterized by a second clock signal having a second frequency; the first frequency being one of greater than, less than, and equal to the second frequency; and the masking signal depends on at least one of the first clock signal, the second clock signal, and a phase signal, the phase signal indicating a common edge of the first clock signal and the second clock signal.

13. The apparatus of claim 1 wherein the first clock domain is characterized by a first clock signal having a first frequency and the second clock domain is characterized by a second clock signal having a second frequency; the first frequency being one of greater than, less than, and equal to the second frequency.

14. The apparatus of claim 13 wherein the input selection signal depends on at least one of the first clock signal, the second clock signal, and a phase signal, the phase signal indicating a common edge of the first clock signal and the second clock signal.

15. The apparatus of claim 13 further comprising a phase-locked loop, the phase locked loop operable to produce at least one of the first clock signal, the second clock signal, and a phase signal, the phase signal indicating a common edge of the first clock signal and the second clock signal.

16. An integrated circuit comprising:

a first clock domain circuit portion characterized by a first clock signal having a first frequency;

a second clock domain circuit portion characterized by a second clock signal having a second frequency; and a gear box circuit for transferring data from the first clock domain circuit portion to the second clock domain circuit portion, the gear box circuit further comprising:

an input data path operable to receive data from the first clock domain circuit portion;

a memory element including:

a data input terminal;

an enable input terminal operable to receive a memory element enabling signal; and a data output terminal;

an input selection circuit coupled to the memory element, the input selection circuit including:

an input selection circuit input terminal; and an input selection terminal operable to receive an input selection signal wherein an output signal at the data output terminal of the memory element is alternately responsive and non-responsive to an input signal applied to the input selection circuit input terminal depending upon the input selection signal and memory enabling signal; and an output path coupled to the data output terminal of the memory element and operable to provide the data to the second clock domain circuit portion.

17. The integrated circuit of claim 16 wherein the memory element is a latch.

18. The integrated circuit of claim 16 wherein the memory element and the input selection circuit together form a two-enable-terminal latch wherein:

the input selection circuit input terminal is the data input terminal of the memory element;

the enable input terminal is a first enable terminal of the two-enable-terminal latch; and the input selection terminal is a second enable terminal of the two-enable-terminal latch.

19. The integrated circuit of claim 16 wherein the input selection circuit is a multiplexer (MUX) including:

a first MUX input terminal coupled to the data output terminal of the memory element;

a second MUX input terminal coupled to the input data path, the second MUX input terminal being the input selection circuit input terminal;

a MUX select input terminal, wherein the MUX select input terminal is the input selection terminal; and a MUX output terminal coupled to the data input terminal of the memory element.

20. The integrated circuit of claim 19 wherein the MUX provides one of the input signal and the output signal to the input terminal of the memory element depending upon the input selection signal applied to the MUX select input terminal.

21. The integrated circuit of claim 16 wherein the memory element enabling signal is one of the first clock signal and the second clock signal.

22. The integrated circuit of claim 16 further comprising masking logic coupled between the output path and the data output terminal of the memory element, the masking logic including a masking logic input terminal operable to receive a masking signal, the masking logic selectively providing the output signal to the output path depending upon the masking signal.

23. The integrated circuit of claim 22 further comprising gear box control logic; the gear box control logic being operable to produce the masking signal based on at least one of the first clock signal, the second clock signal, and a phase signal, the phase signal indicating a common edge of the first clock signal and the second clock signal.

24. The integrated circuit of claim 16 further comprising gear box control logic; the gear box control logic being operable to produce the input selection signal based on at least one of the first clock signal, the second clock signal, and a phase signal, the phase signal indicating a common edge of the first clock signal and the second clock signal.

25. The integrated circuit of claim 24 wherein the gear box control logic includes a flip-flop.

26. The integrated circuit of claim 16 further comprising a phase-locked loop, the phase-locked loop operable to produce at least one of the first clock signal, the second clock signal, and a phase signal, the phase signal indicating a common edge of the first clock signal and the second clock signal.

27. The integrated circuit of claim 16 wherein the integrated circuit is a north-bridge circuit.

28. A computer system comprising:
a processor;
a memory coupled to the processor;
a north-bridge circuit coupled to the processor and the memory, the north-bridge circuit further comprising:
a first clock domain circuit portion characterized by a first clock signal having a first frequency;
a second clock domain circuit portion characterized by a second clock signal having a second frequency; and
a gear box circuit for transferring data from the first clock domain circuit portion to the second clock domain circuit portion, the gear box circuit further comprising:
an input data path operable to receive data from the first clock domain circuit portion;
a memory element including:
a data input terminal;
an enable input terminal operable to receive a memory element enabling signal; and
a data output terminal;
an input selection circuit coupled to the memory element, the input selection circuit including:
an input selection circuit input terminal; and
an input selection terminal operable to receive an input selection signal wherein an output signal at the data output terminal of the memory element is alternately responsive and non-responsive to an input signal applied to the input selection circuit input terminal depending upon the input selection signal and memory enabling signal; and
an output path coupled to the data output terminal of the memory element and operable to provide the data to the second clock domain circuit portion.

29. The computer system of claim 28 further comprising a communications bus; the processor, memory, and north-bridge circuit being coupled to each other through the communications bus.

30. The computer system of claim 28 wherein the memory element is a latch.

31. The computer system of claim 28 wherein the memory element and the input selection circuit together form a two-enable-terminal latch wherein:
the input selection circuit input terminal is the data input terminal of the memory element;
the enable input terminal is a first enable terminal of the two-enable-terminal latch; and
the input selection terminal is a second enable terminal of the two-enable-terminal latch.

32. The computer system of claim 28 wherein the input selection circuit is a multiplexer (MUX) including:
a first MUX input terminal coupled to the data output terminal of the memory element;
a second MUX input terminal coupled to the input data path, the second MUX input terminal being the input selection circuit input terminal;
a MUX select input terminal, wherein the MUX select input terminal is the input selection terminal; and
a MUX output terminal coupled to the data input terminal of the memory element.

33. The computer system of claim 32 wherein the MUX provides one of the input signal and the output signal to the input terminal of the memory element depending upon the input selection signal applied to the MUX select input terminal.

34. The computer system of claim 28 further comprising masking logic coupled between the output path and the data output terminal of the memory element, the masking logic including a masking logic input terminal operable to receive a masking signal, the masking logic selectively providing the output signal to the output path depending upon the masking signal.

35. The computer system of claim 34 further comprising gear box control logic; the gear box control logic being operable to produce the masking signal based on at least one of the first clock signal, the second clock signal, and a phase signal, the phase signal indicating a common edge of the first clock signal and the second clock signal.

36. The computer system of claim 28 further comprising gear box control logic; the gear box control logic being operable to produce the input selection signal based on at least one of the first clock signal, the second clock signal, and a phase signal, the phase signal indicating a common edge of the first clock signal and the second clock signal.

37. The computer system of claim 28 further comprising a phase-locked loop, the phase-locked loop operable to produce at least one of the first clock signal, the second clock signal, and a phase signal, the phase signal indicating a common edge of the first clock signal and the second clock signal.

* * * * *